UNITED STATES PATENT OFFICE.

WILLIAM A. WINDER AND MELVILLE M. SHEARER, OF SAN DIEGO, CAL.

IMPROVEMENT IN COMPOSITION BEVERAGE.

Specification forming part of Letters Patent No. 180,692, dated August 1, 1876; application filed May 9, 1876.

*To all whom it may concern:*

Be it known that we, WILLIAM A. WINDER and MELVILLE M. SHEARER, both of San Diego, in the county of San Diego and State of California, have invented or discovered a new and useful Composition Beverage; and we do hereby declare that the following is a full, clear, and exact description thereof, which will enable others skilled in the art to which it appertains to make and use the same.

This invention relates to the curative art, and consists of a composition beverage for the treatment and cure of weakness, debility, leucorrhœa, blennorrhea, and other similar disorders or diseases.

The composition or mixture is composed of the following ingredients, and the recipe for combining and preparing it is as follows, to wit: Take of tincture orange-peel, two drams; tincture cardamom-seed, two drams; tincture damiana, two ounces; whisky or proof spirits, ten ounces; water, one and a half ounce. Mix all thoroughly together, and put in bottles for use. The specific amount and directions for use will, of course, vary as the nature of the case or treatment requires.

This composition is used with good effect as a strengthening tonic or appetizer, and it is a sovereign blood cleanser and purifier. It is also employed for numerous purposes with beneficial effect.

We do not limit ourselves to the specific amounts or proportions herein specified, as they may be varied as desired or found necessary, and, instead of using the "tincture," fluid extract may be used in place thereof.

The ingredient-tincture or fluid extract of damiana herein mentioned is obtained from an herb indigenous to Mexico or Lower California, where it grows in great profusion and luxuriance, commonly known as the "damiana plant." The exact technical or botanical name or true classification of this plant we are unable to present, because it has not yet, as far as we are aware, been determined upon.

The properties or action of this ingredient are those of a special tonic, and by its action as such invigorating all the functions of the system.

Having thus described our invention, what we claim as new, and desire to secure by Letters Patent, is—

A composition beverage, consisting of the following ingredients, viz: tincture or fluid extract orange-peel, tincture or fluid extract cardamom-seed, tincture or fluid extract damiana, whisky or proof spirits, and water, substantially as described.

In testimony that we claim the foregoing as our own we affix our signatures in presence of two witnesses.

WILLIAM A. WINDER.
   MELVILLE M. SHEARER.

Witnesses:
 C. P. NOELL,
 SAML. STORER.